United States Patent Office 2,951,827
Patented Sept. 6, 1960

2,951,827

PROCESS OF PRODUCTION OF HIGH-MOLECULAR LINEAR POLYESTERS FROM AROMATIC DICARBOXYLIC ACID DIOLESTERS

Erhard Siggel, Kleinwallstadt, Germany, assignor to Vereinigte Glanzstoff-Fabriken, A.G., Wuppertal-Elberfeld, Germany No Drawing. Filed Feb. 17, 1955, Ser. No. 488,988

Claims priority, application Germany Feb. 3, 1951

2 Claims. (Cl. 260—75)

This invention relates to a process of preparing linear polyesters free from cross-linkage, by condensing esters formed from aromatic dicarboxylic acids and diols, in the presence of a certain catalyst. This application is a continuation-in-part of my application Serial No. 268,353, filed January 25, 1952, now abandoned.

I have discovered that esters such as terephthalic acid diglycol ester, can be condensed in the presence of zinc acetate to yield particularly high-molecular linear bodies.

The effectiveness of zinc acetate, when present in suitable quantities, is partly based on the fact that a decomposition of the products formed as well as of the diols split off, which due to the influence of the necessarily high condensation temperatures usually is quite unavoidable, is either materially delayed or even entirely arrested. This prevents the chain from being broken off prematurely, or prevents long chain compounds already formed from splitting up again and getting cross-linked. Moreover, the time period required for condensation is materially reduced.

In the absence of zinc acetate according to the invention, the premature break in the chain is principally due to a thermic dehydration of the diols or the terminal diol groups of the polyesters formed, which manifests itself by the formation of unsaturated terminal groups. With condensation of this kind employing e.g. glycol as the alcoholic component of the ester, crotonaldehyde and acetaldehyde are among the by-products obtained, the latter deriving from vinyl alcohol formed in an intermediate stage. These side reactions frequently meet with particularly favorable conditions if the catalyst used in a previous alcoholysis is still contained, even in small quantities, in the material to be condensed.

In accordance with this invention, it is advantageous to proceed by adding to the diol esters to be condensed which on preparation by esterification or alcoholysis may still be impure or may be partly pre-condensed, small quantities and more specifically, less than about 0.5 mol percent of the catalyst according to the invention (calculated for the cationic component for 1 mol of diol ester), and heating while agitating intensely, the mixture by slowly raising the temperature, finally in a vacuum of 10 mm. Hg to 10°–50° above the melting point of the polyester to be obtained, until the viscosity of the polycondensate is suitable for the particular use intended. The chain length can be limited in a known manner, by a suitable dose of a monocarboxylic acid or the like acting as a chain breaker whenever the anionic component of the catalyst, by itself, is not adapted to break the chain.

The invention embraces the concept of proceeding on the basis of diolesters which, dependent on the conditions under which they were prepared, represent more or less pre-condensed products.

The method of the invention, in a minimum time period taken up by condensation, yields polyesters of high viscosity which on being spun and stretched, display a tensile strength of about 70 breaking kilometers.

The attainment of tensile strength of this order constitutes a material improvement over prior art processes.

The invention will be more fully described by reference to the following example. It should be understood, however, that the example is given by way of illustration only and that the invention is not to be limited by the details set forth therein. In this example reference is made to parts by weight.

Example 25 parts by weight of terephthalic acid ethyleneglycol diester (melting at 110.5° C.) were mixed with 0.018 gr. zinc acetate and the mixture molten down in a vessel provided with a gas supply tube, a vigorously acting tightly packed agitating device and a descending air-cooler and receiver. A current of nitrogen was introduced into the vessel which was heated to 250° C. until the glycol had been split off. The current of nitrogen was then gradually slowed down and at the same time the pressure within the vessel was reduced within half an hour below 10 mm. mercury. During this phase of the operation further quantities of glycol were distilled off. Under intensive stirring the temperature in the vessel was now raised gradually during another half hour to 270–280° C., whereupon the molten substance was heated to this temperature during another 30–60 min. The viscosity of the mass in the vessel increased gradually. After two hours, counting from the start, the product was forced by aid of nitrogen under pressure through a valve provided in the bottom of the vessel and was cooled in water. The polycondensate thus obtained after having been thoroughly dried, could be spun to form threads which after the highest possible stretching were found to have a tensile strength of 65–75 breaking kilometers.

Various changes may be made in the steps of the process described above without departing from the invention or sacrificing the advantages thereof.

I claim:

1. The method of preparing a high molecular linear polyester of ethyleneglycol and terephthalic acid which comprises admixing with the ethyleneglycol diester of terephthalic acid prior to condensation a catalytic amount, less than about 0.5 mol percent per 1 mole of said diester, of a condensation catalyst consisting essentially of zinc acetate, the amount of said catalyst being calculated for the zinc content, and then polycondensing said diester in vacuo at about 10 mm. mercury pressure and at a temperature from about 10° to about 50° C. above the melting point of the polyester to be obtained, for a period of about 1 to 2 hours.

2. The method of preparing a high molecular linear polyester of ethylene glycol and terephthalic acid which comprises admixing with the ethyleneglycol diester of terephthalic acid prior to condensation a catalytic amount, less than about 0.5 mole percent per 1 mole of said diester, of a condensation catalyst consisting essentially of zinc acetate, the amount of said catalyst being calculated for the zinc content, and then polycondensing said diester in vacuo at about 10 mm. mercury pressure and at a temperature between about 250° and 280° C. for a period of about 1 to 2 hours.

References Cited in the file of this patent

UNITED STATES PATENTS 2,681,360    Vodonik _____ June 15, 1954